(12) United States Patent
Radigan

(10) Patent No.: US 10,175,964 B2
(45) Date of Patent: Jan. 8, 2019

(54) COMPILER CACHING FOR RUNTIME ROUTINE REDUNDANCY TRACKING

(71) Applicant: Microsoft Corporation, Redmond, WA (US)

(72) Inventor: James J. Radigan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 14/517,779

(22) Filed: Oct. 17, 2014

(65) Prior Publication Data

US 2016/0092183 A1 Mar. 31, 2016

Related U.S. Application Data

(60) Provisional application No. 62/056,004, filed on Sep. 26, 2014.

(51) Int. Cl.
*G06F 8/41* (2018.01)
*G06F 9/448* (2018.01)
*G06F 21/52* (2013.01)

(52) U.S. Cl.
CPC ............ *G06F 8/4435* (2013.01); *G06F 8/443* (2013.01); *G06F 8/4442* (2013.01); *G06F 9/4486* (2018.02); *G06F 21/52* (2013.01)

(58) Field of Classification Search
CPC ...... G06F 8/4435; G06F 8/443; G06F 8/4442; G06F 9/4426; G06F 21/125
See application file for complete search history.

(56) References Cited

U.S. PATENT DOCUMENTS

| 5,555,428 | A | 9/1996 | Radigan et al. |
| 5,991,540 | A | 11/1999 | Radigan |
| 5,999,735 | A | 12/1999 | Radigan |
| 6,002,879 | A | 12/1999 | Radigan et al. |
| 6,016,398 | A | 1/2000 | Radigan |
| 6,029,005 | A | 2/2000 | Radigan |

(Continued)

OTHER PUBLICATIONS

Pewny et al., "Control-flow restrictor: compiler-based CFI for iOS," 2013, Proceedings of the 29th Annual Computer Security Applications Conference, pp. 309-318.*

(Continued)

*Primary Examiner* — Thuy Dao
*Assistant Examiner* — Stephen D Berman
(74) *Attorney, Agent, or Firm* — Ogilvie Law Firm

(57) ABSTRACT

A compiler-created cache contains target addresses of multiple indirect routine call sites. Ordinals assigned to indirect routine call sites are used with hardcoded offsets into the cache. Ordinals may be computed using a routine counter and an indirect call site counter. At runtime a target address of an indirect routine call site is compared to an entry in the cache using the hardcoded offset for efficiency. If the target address matches the cache entry, then a redundant call is avoided; otherwise, the call is not redundant, and the cache is updated. The call tested for redundancy may be a security check for malware, or a computationally expensive routine which calculates a return value without any side effects. Stack pointer validity may be checked. The cache may be guarded with code for trustworthy computing. Tail merging may be performed.

20 Claims, 2 Drawing Sheets

(56) References Cited

U.S. PATENT DOCUMENTS

| | | | |
|---|---|---|---|
| 6,031,995 A | 2/2000 | Radigan | |
| 6,049,667 A * | 4/2000 | Bates | G06F 8/447 717/138 |
| 6,151,704 A | 11/2000 | Radigan | |
| 6,247,175 B1 * | 6/2001 | Ledford | G06F 8/4435 717/107 |
| 6,738,967 B1 | 5/2004 | Radigan | |
| 7,293,264 B2 | 11/2007 | Bicsak et al. | |
| 7,370,321 B2 | 5/2008 | Radigan | |
| 7,389,501 B1 | 6/2008 | Farouki et al. | |
| 7,539,983 B2 | 5/2009 | Bearman et al. | |
| 7,631,304 B2 | 12/2009 | Bearman et al. | |
| 7,634,778 B2 | 12/2009 | Mosier et al. | |
| 8,458,681 B1 * | 6/2013 | Coutant | G06F 11/3624 717/124 |
| 8,667,474 B2 | 3/2014 | Radigan | |
| 2004/0268370 A1 | 12/2004 | Mosier et al. | |
| 2005/0010804 A1 | 1/2005 | Bruening et al. | |
| 2005/0015750 A1 * | 1/2005 | Bley | G06F 8/71 717/127 |
| 2005/0071832 A1 * | 3/2005 | Kawahito | G06F 8/443 717/151 |
| 2005/0144471 A1 * | 6/2005 | Shupak | G06F 21/52 713/193 |
| 2006/0059195 A1 | 3/2006 | Hall et al. | |
| 2006/0123403 A1 * | 6/2006 | BrueckImayr | G06F 9/4486 717/136 |
| 2008/0148226 A1 * | 6/2008 | Chen | G06F 9/4486 717/109 |
| 2009/0119654 A1 * | 5/2009 | Kawahito | G06F 8/443 717/154 |
| 2011/0225573 A1 * | 9/2011 | Zaafrani | G06F 8/4435 717/160 |
| 2013/0007420 A1 * | 1/2013 | Van Assche | G06F 21/52 712/220 |
| 2013/0283245 A1 * | 10/2013 | Black | G06F 8/433 717/130 |
| 2014/0020092 A1 | 1/2014 | Davidov | |
| 2014/0082327 A1 * | 3/2014 | Ghose | G06F 9/3877 712/205 |
| 2014/0372996 A1 * | 12/2014 | Ardoint | G06F 8/4441 717/151 |
| 2015/0052507 A1 * | 2/2015 | Ji | G06F 8/4435 717/152 |
| 2015/0128208 A1 * | 5/2015 | Kim | G06F 21/53 726/1 |
| 2015/0135313 A1 * | 5/2015 | Wesie | G06F 9/445 726/22 |
| 2015/0370560 A1 * | 12/2015 | Tan | G06F 9/30058 717/148 |

OTHER PUBLICATIONS

Wikipedia, "Array data structure," 2013, downloaded from the Wayback Machine Internet Archive at <url>http://web.archive.org/web/20131210220526/http://en.wikipedia.org/wiki/Array_data_structureon Mar. 16, 2017, pp. 1-8.*

Allain, "Constexpr—Generalized Constant Expressions in c++11," 3013, downloaded from the Wayback Machine Internet Archive at <url>http://web.archive.org/web/20130405180214/http://www.cprogramming.com/c++11/c++11-compile-time-processing-with-constexpr.htmlon Mar. 20, 2017, pp. 1-3.*

UVA, "x86 Assembly Guide," 2013, downloaded from the Wayback Machine Internet Archive at <url>http://web.archive.org/web/20130703144650/http://www.cs.virginia.edu/~evans/cs216/guides/x86.html on Mar. 22, 2017, pp. 1-17.*

Dvorak et al., "Infrastructure for Profile Driven Optimizations in GCC Compiler," 2013, downloaded from the Wayback Machine Internet Archive at <url>:http://web.archive.org/web/20130501110949/http://www.ucw.cz/~hubicka/papers/proj/node10.html on Mar. 22, 2017, pp. 1-16.*

Kumar, "Value Reuse Optimization: Reuse of Evaluated Math Library Function Calls Through Compiler Generated Cache," 2003, ACM SIGPLAN Notices, vol. 38, isssue 8, pp. 60-66, downloaded from the Internet at <url>:https://dl.acm.org.*

Csaba Moritz et al., "FlexCache: A Framework for Flexible Compiler Generated Data Caching," 2000, IMS 2001, LNCS 2107, pp. 135-146, downloaded from the Internet at <url>:https://link.springer.com/content/pdf/10.1007%2F3-540-44570-6_9.pdf. (Year: 2001).*

Erik Hallnor et al., "A fully associative software-managed cache design," 2000, Proceedings of the 27th annual international symposium on Computer architecture, pp. 107-116, downloaded from the Internet at <url>: https://dl.acm.org/citation.cfm?id=339660. (Year: 2000).*

L. Shamir et al., "Dynamic reuse of subroutine results," 2006, Journal of Systems Architecture, vol. 52, Issue 10, pp. 603-608, downloaded from the Internet at <url>:https://www.sciencedirect.com/science/article/pii/S1383762106000610. (Year: 2006).*

"International Search Report and Written Opinion Issued in PCT Application No. PCT/US2015/052140", dated Dec. 16, 2015, 14 Pages.

"Second Written Opinion Issued in PCT Application No. PCT/US2015/052140", dated Aug. 4, 2016, 5 Pages.

"International Preliminary Report on Patentability Issued in PCT Application No. PCT/US2015/052140", dated Nov. 8, 2016, 8 Pages.

Calder, et al., "Reducing Indirect Function Call Overhead in C++ Programs", In Proceedings of the 21st ACM SIGPLAN-SIGACT symposium on Principles of programming languages, Feb. 1, 1994, 11 pages.

Cohn, et al., "Hot Cold Optimization of Large Windows/NT Applications", In Proceedings of the 29th annual ACM/IEEE international symposium on Microarchitecture, Dec. 2, 1996, 10 pages.

"Profile-Guided Optimizations Overview", Retrieved at <<https://software.intel.com/en-us/node/510315>>, no later than Aug. 12, 2014, 2 pages.

Wang, et al., "Code Generation and Optimization for Transactional Memory Constructs in an Unmanaged Language", In International Symposium on Code Generation and Optimization, Mar. 11, 2007, 12 pages.

"POGO", Retrieved at <<http://blogs.msdn.com/b/vcblog/archive/2008/11/12/pogo.aspx-title=microsoft?PageIndex=2>>, Nov. 12, 2008, 3 pages.

"TMS320C28x Optimizing C/C++ Compiler v6.2.4", Retrieved at <<http://www.ti.com/lit/ug/spru514g/spru514g.pdf>>, Dec. 2012, 189 pages.

Holzle, et al., "Optimizing Dynamically-Typed Object-Oriented Languages With Polymorphic Inline Caches", In Proceedings of the European Conference on Object-Oriented Programming, Jul. 15, 1991, 18 pages.

"CPU cache", Retrieved at <<http://en.wikipedia.org/wiki/CPU_cache>>, Aug. 12, 2014, 12 pages.

* cited by examiner

COMPILER CACHING FOR RUNTIME ROUTINE REDUNDANCY TRACKING

RELATED APPLICATION

The present application claims priority to, and incorporates by reference the entirety of, U.S. provisional patent application No. 62/056,004 filed 26 Sep. 2014.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some computer programming environments support function pointers, which are also referred to in some cases as routine pointers, subroutine pointers, or procedure pointers. A function pointer is a pointer to a cell in memory that contains a function address. Most modern instruction sets allow for an instruction that will do an indirect call (in addition to a normal direct call) using the function pointer directly as an operand. The function pointer operand contains the function address where control flow is to continue. The indirect call instruction will first load the function address stored at the function pointer and then call the first machine instruction at that location which is supposed to be the beginning of executable code (a user intentionally authored) within a computer system's memory. A routine call (a.k.a. "invocation") made through a function pointer is also known as an "indirect" call because the function is invoked indirectly through an address stored in a pointer variable instead of being invoked directly through a fixed name or a fixed address known at compile time. As with direct function calls, a system may pass arguments to an indirectly invoked routine, may undergo side effects from execution of the routine, and may receive a return value from the routine.

SUMMARY

Some embodiments or examples emit code which compares an indirect call site target address to a compiler-managed cache entry to avoid at least one redundant execution of target code at the target address. Some embodiments or examples emit code which compares an indirect call site target address to a compiler-managed cache entry to avoid at least one redundant execution of intervening code which performs a security check on target code at the target address. In some embodiments or examples, at least some of the different indirect call sites in code being compiled are assigned different respective ordinals by a compiler, and at least some of those ordinals are used to calculate offsets into an array of cache entries, and the offsets are hardcoded by the compiler in emitted machine code instructions which compare indirect call site target addresses to compiler-managed cache entries.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope of any example.

DETAILED DESCRIPTION

Acronyms

Figure 1:
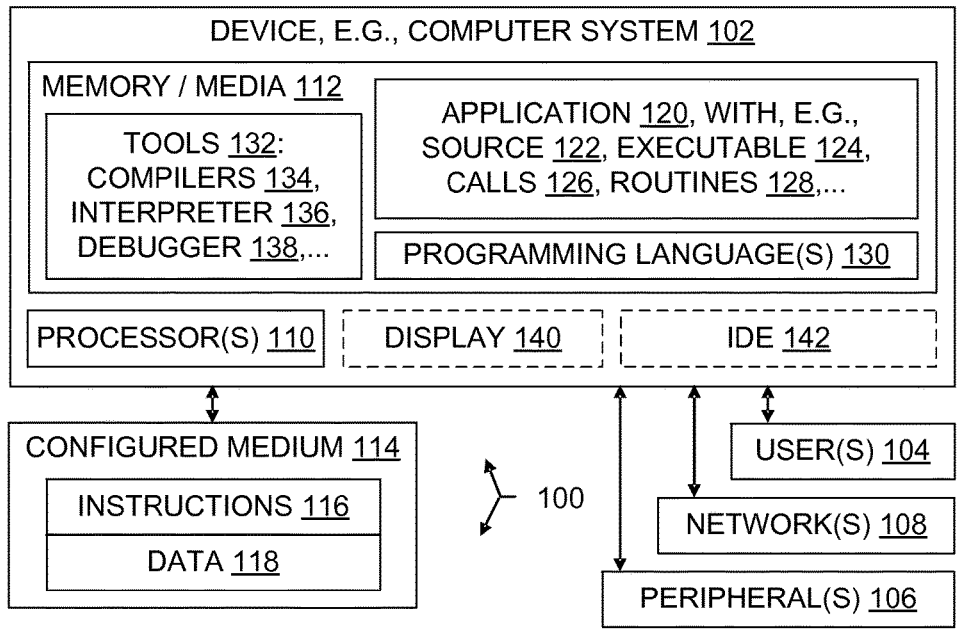
FIG. 1 is a block diagram illustrating a computer system having at least one processor and at least one memory which interact with one another under the control of software for building an executable version of an application and/or under the control of executable application software, as well as illustrating other items in an operating environment which may extend over multiple network nodes, and also illustrating aspects of some configured storage media.

Some acronyms are defined below, but others may be defined elsewhere herein or require no definition to be understood by one of skill.

ALU: arithmetic and logic unit
AOT: ahead of time
API: application program interface
CD: compact disc
CPU: central processing unit
DLL: dynamic-link library
DOM: document object model
DVD: digital versatile disk or digital video disc
ECMA: European Computer Manufacturer's Association, now Ecma International
ESP: a stack pointer register in x86 processors
FPGA: field-programmable gate array
FPU: floating point processing unit
GPU: graphical processing unit
GUI: graphical user interface
IDE: integrated development environment, sometimes also called "interactive development environment"
IoT: Internet of Things
ISO/IEC International Organization for Standardization/International Electrotechnical Commission
JIT: Just-in-time
RAM: random access memory
ROM: read only memory Overview The examples given are merely illustrative. This discussion is not intended to identify key features or essential features of the claimed subject matter, nor is it intended to be used to limit the scope of the claimed subject matter.

Under certain circumstances described herein, a code generator may emit code which reduces the number of routine invocations in a programming language which uses virtual calls or other indirect calls, without changing the semantics (a.k.a. black-box functionality) of an application containing the emitted code. In particular, some examples emit code which reduces the number of invocations of security routines during execution of an application without thereby reducing the security of the application. This reduction has corresponding effects such as decreased execution time for the generated code and decreased memory usage in some call chains, which in turn reduce processor load, energy usage, and hardware capacity requirements.

Some of the programming languages which use indirect calls are dynamically typed programming languages. Examples of dynamically typed programming languages are numerous and generally familiar to those of skill in the art. Perhaps the most widely used example at present is the JavaScript language used in web browsers and elsewhere; it is an implementation of the ECMAScript language standardized in the ECMA-262 specification and ISO/IEC 16262. Some programming languages which use indirect calls are object-oriented languages. C++, Objective-C, Smalltalk, Delphi, Java, Javascript, C#, Perl, Python, Ruby and PHP are some examples of object-oriented programming languages. Some programming languages which use indirect calls support function pointers. Some of the programming languages which support function pointers are PL/I, COBOL, Fortran, dBASE dBL, C, C++ and D.

Since indirect calls transfer control flow to an address that is determined at runtime, they are sometimes the target of malicious attacks where the location that contains a valid function is overwritten with an attacker's function address. In some embodiments, when an indirect call being compiled would pass control to a target that appears in a compiler's list of vetted targets, the compiler emits code passing control to that target. But when the indirect call being compiled would pass control to a target that the compiler has not vetted, then the compiler emits code that (a) does a heavy weight security check, (b) passes control to the target if the target is approved by the heavy weight security check, and (c) adds the target to the list of vetted targets. The list of vetted targets is maintained by the compiler in a cache.

Some examples described herein may be viewed in a broader context. For instance, concepts such as caching, compilation, hard-coding, indirection, offsets, polymorphism, redundancy, sequences, type checking, and/or security may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems and improve the function of computer systems. Other media, systems, and methods involving caching, compilation, hard-coding, indirection, offsets, polymorphism, redundancy, sequences, type checking, and/or security are outside the present scope. Accordingly, vagueness, mere abstractness, lack of technical character, and accompanying proof problems are also avoided under a proper understanding of the present disclosure.

The technical character of examples described herein will be apparent to one of ordinary skill in the art, and will also be apparent in several ways to a wide range of attentive readers. First, some embodiments address technical problems such as execution performance costs of security check, shortcomings of per-call-site security check mechanisms, and preserving both security and performance despite reduced security checks. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein guard a series of indirect routine calls with a single initial security check plus some very efficient cache tests. Third, technical effects provided by some embodiments include a reduction in the number of security checks without a corresponding reduction in application security, reduced executable code memory usage, and/or increased execution speed of ECMAScript-compliant languages and other languages that support indirect routine calls. Fourth, some embodiments include technical adaptations such as a compiler-managed cache, tests against the cache with hard-coded offsets, and code generators which emit code to test jump targets against cache entries and avoid check routine calls which are determined to be redundant as a result of the jump target tests.

Some Terminology

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography, including the right to copy language into claims and into child applications from any location herein. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

In some situations, a compiler can generate code that includes an offset as a constant numeric value, instead of generating instructions to calculate an offset value later while the generated program code is running. Offsets and other values that are embedded in generated code at compile time as constants are said to be "hard-coded".

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" may be used herein as a term of the computing science arts, and in that technical sense encompasses resource users, namely, coroutines, threads, tasks, interrupt handlers, application processes, kernel processes, procedures, and object methods, for example. "Process" may also be used herein as a patent law term of art, e.g., in describing a process claim as opposed to a system claim or an article of manufacture (configured storage medium) claim. Similarly, "method" may be used herein at times as a technical term in the computing science arts (a kind of "routine") and also at times as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Persons of skill will acknowledge that in some cases calculations simply cannot be performed rapidly enough and reliably enough by mental steps or by paper and pencil to provide the technical effects of an embodiment.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allocating, assigning, avoiding, caching, calculating, calling, checking, comparing, compiling, determining, emitting, executing, generating, hardcoding, identifying, initializing, invoking, jumping, passing, pushing, popping, testing, updating (and allocates, allocated, assigns, assigned, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere propagated signal, for example. Unless expressly stated otherwise in a claim, a claim does not cover a signal per se. For the purposes of patent protection in the United States, a memory, a computer-readable storage medium, and any other computer-readable medium is not a propagating signal or a carrier wave, and it is not outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media, computer readable media, and computer readable memory, on the one hand, and (b) transmission media, also referred to as signal media or propagated signals, on the other hand. A transmission medium is a propagating signal or a carrier wave medium. By contrast, computer readable media, computer readable storage media, and computer readable memory are not propagating signal or carrier wave media. Unless expressly stated otherwise, "computer readable medium" means a computer readable storage medium, not a propagating signal per se.

An "embodiment" herein is an example. The term "embodiment" is not interchangeable with "the invention"; neither is the term "example". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, as an IoT node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation) or other game server. The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have code such as source code 122 and executable code 124, which includes calls 126 to routines 128, and data structures such as objects, lists, trees, other linked structures, and/or other constructs (sometimes referred to as "artifacts"). The term "application" is used broadly herein. Some examples of applications include business software, industrial software, medical applications, collaboration software, software which provides access to a database, software which displays editable information, games, app store purchases, software-as-a-service code, middleware, kernels, server code and other back-end applications, and web browsers and scripts or other code run by them as plug-ins.

Source 122 is written in one or more programming languages 130. Executable code created from source in a given programming language 130 is sometimes also referred to as being in that language 130, but executable code is understood to include machine code. As used herein, "machine code" means low-level code, or computer code that is tailored to a particular hardware architecture or tailored to a particular virtual machine architecture. Some familiar examples of machine code include compiled code, microcode, firmware code, binary code, native code, object code, assembly language code, p-code, bytecode, dynamic link library code, and common intermediate language code.

As indicated, some environments 100 include software development tools 132 such as compilers 134, interpreters 136, and debuggers 138 which assist with software development by producing and/or transforming code 122, 124. The code 122, 124, the tools 132, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s) 140, and battery(ies), an operating environment may also include other hardware, such as buses, power supplies, wired and wireless network interface cards, and accelerators, for instance, whose respective operations are described herein to the extent not already apparent to one of skill.

A given operating environment 100 may include an Integrated Development Environment (IDE) 142 which provides a developer with a set of coordinated software development tools 132 such as AOT compilers, JIT compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages 130, programming models, and programs 120, as well as with technical endeavors outside the field of software development per se.

One or more items may be shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

One of skill will appreciate that the foregoing aspects and other aspects presented herein under "Operating Environments" may also form part of a given embodiment. This document's headings are not intended to provide a strict classification of features into embodiment and non-embodiment feature classes.

Systems

Figure 2:
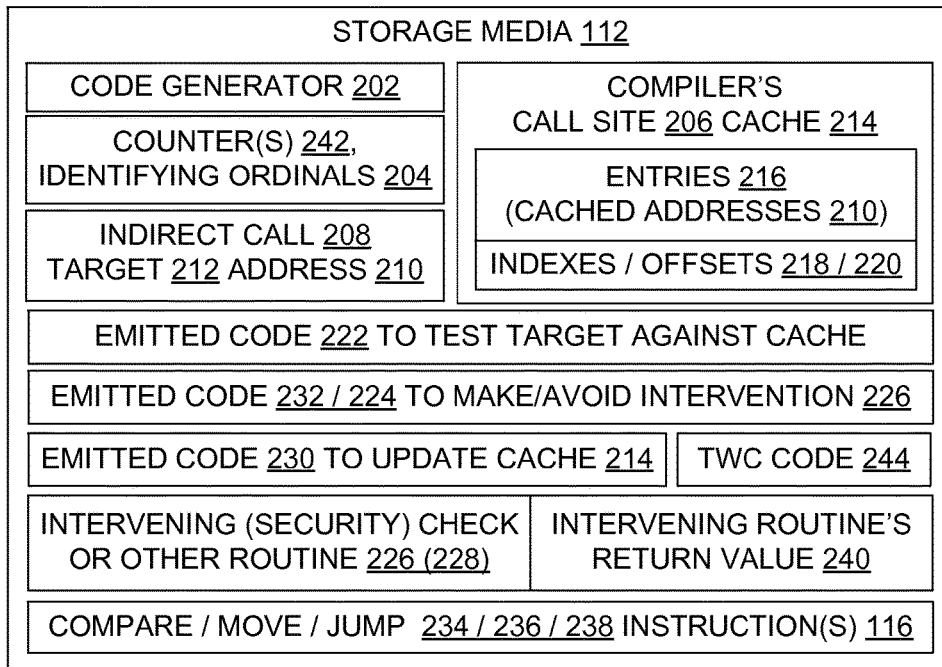
FIG. 2 is a block diagram further illustrating aspects of compiler caching for runtime routine redundancy tracking in some architectures.

FIG. 2 illustrates aspects of an architecture which is suitable for use with some embodiments. A code generator 202 is typically located within a compiler 134. The compiler may be on one machine whereas the output of the code generator forms part of an application 120 on a different machine. The code generator 202 output includes in particular pieces of executable code 124 for tracking at least some of the redundancy in routine calls, such as calls which return the same result with no side effect, and calls which test the security of another routine which has already passed the same security test earlier. Those of skill understand that a "side effect" of a routine is an effect created by the routine which alters state outside of the routine, and which is in addition to any value returned by the routine on the stack or returned by the routine via a parameter that was passed to the routine via the stack.

In some embodiments, a compiler assigns ordinals 204 to call sites 206. An ordinal 204 is a single number, or a sequence or set of numbers, which uniquely identifies the call site during a compilation. Ordinals 204 may be assigned based on one or more counters 242 maintained by the compiler as the compiler's focus moves through code 122 being compiled. The call sites 206 may be direct or indirect calls, but some embodiments focus on indirect calls 208 because the added level of indirection (e.g., the use of a function pointer) tends to make indirect calls less efficient and/or less secure, thereby providing opportunities for optimizations. An indirect call site specifies at runtime an address 210 to which control will be passed. The address 210 presumably marks the beginning of a desired target 212 but if security has been compromised then the address 210 may point instead to injected malware. A distinction can thus be made between the address 210 and the target 212 that resides at that address, but for convenience one may also use "target" and "address" interchangeably to mean either the location of a routine or the instructions of the routine, and those of skill in the art will understand from context and their technical knowledge which meaning is intended.

In some embodiments, a compiler 134 creates and/or manages a call site cache 214 whose entries are either null or the addresses 210 previously encountered during execution of an application. The call site cache 214 may be implemented for instance as a fixed size array of contiguous entries, each entry the size of a function pointer, and each entry corresponding to a different call site. The array or other cache implementation may be indexed according to the call site ordinals, e.g., entry 1 corresponding to call site number 1, entry 2 corresponding to call site number 2, and so on.

Ordinals 204 and cache indexes 218 may start at different values, e.g., one may have an implementation in which entry 0 corresponds to call site number 1, entry 1 corresponds to call site number 2, and so on. Offsets 220 into the cache 214 are multiples of the indexes 218, which correlate the smallest addressable memory unit (e.g., bytes) with the number of such smallest addressable memory units used to hold a function pointer (e.g., 4 bytes per 32-bit function pointer).

The code generator 202 may emit code 222 which tests a call site's target at runtime by comparing it to the call site's cache entry. If they match, then emitted code 224 avoids invoking a check 226 (such as a security check 228) because the match indicates that the check was previously invoked for this target at this call site. On the other hand, if the test determines that the current target does not match the current cache entry but is instead novel (so far as the cache entry is concerned), then emitted code 230 updates the cache 214 by placing the target (that is, the target address) in the cache entry for the call site in question, and other emitted code 232 invokes the check 226. The relative order of cache update and the check may be varied in some cases, although it is expected that the cache update will often be done first. However, some embodiments do the check 226 first, and some do not necessarily update the cache entry even if the check is done.

Some embodiments provide a computer system 102 with a logical processor 110 and a memory medium 112 configured by circuitry, firmware, and/or software to provide technical effects such as call site target novelty testing as described herein. In one example, a system 102 configured for generation and execution of machine code for property accesses in a dynamically typed programming language includes at least one processor 110 and a memory 112 in operable communication with the processor.

Some embodiments include a system 102 for generation and execution of machine code for dynamic calls in a programming language. The system includes at least one processor 110, and a memory 112 in operable communication with the processor. The system 102 also includes a compiler-created cache 214 which is updated during runtime to contain target addresses 210 of multiple indirect routine call sites 206. Unlike a polymorphic inline cache associated with a particular call site, this compiler-created cache 214 includes only a single entry 216 per call site and also includes entries for a plurality of call sites 206.

Some embodiments include a system 102 for generation and execution of machine code for dynamic calls in a programming language. The system includes at least one processor 110, and a memory 112 in operable communication with the processor. The system 102 also includes compiler-generated code 124 which compares at runtime a target address 210 of an indirect routine call site to an entry in a cache 214, using as an index 218 into the cache an ordinal 204 which was assigned to the call site at compile time.

In some embodiments, a system 102 includes a code generator 202 which assigns ordinals 204 to call sites 206 and hardcodes 320 accesses to the compiler-created cache using offset constants 220 that are calculated 322 at compile-time based on the respective call site ordinals.

Some embodiments include a system 102 for generation and execution of machine code for dynamic calls in a programming language, in which the system includes at least one processor 110, a memory 112 in operable communication with the processor, and at least one of the following: (a) a compiler-created cache 214 in the memory, the cache configured to be updated during runtime to contain target addresses 210 of multiple indirect routine call sites 206; (b) an assignment of respective ordinals 204 to different indirect routine call sites 206 in code which is being compiled in the system 102; (c) compiler-generated machine code 222 which upon execution by the processor performs a comparison at runtime comparing a target address 20 of an indirect routine call site 206 to an entry 216 in a compiler-created cache 214 that contains entries for target addresses of multiple indirect routine call sites 206, said comparison performed using as an index 218 into the compiler-created cache an ordinal 204 which was assigned to the indirect routine call site at compile time.

In some examples or embodiments, the compiler-created cache 214 is present and includes only a single entry 216 per indirect routine call site 206.

In some examples or embodiments, the system 102 includes a code generator 202 which assigns respective ordinals 204 to different indirect routine call sites 206 and which hardcodes accesses to the compiler-created cache 214 using offset constants 220 that are calculated at compile-time based on the respective ordinals.

In some examples or embodiments, the compiler-generated machine code 124 includes a sequence of instructions 116 which includes a comparison 222 between the target address 210 of the indirect routine call site 206 and the compiler-created cache entry 216 at a hardcoded offset 220 in the compiler-created cache 214, and the sequence of instructions 116 also includes a jump 224 to avoid calling an intervening routine 226 when the target address 210 equals the compiler-created cache entry 216.

In some examples or embodiments, the intervening routine 226 is configured to perform at least one of the following: a security check 228 to determine whether the target 212 includes malware, or a calculation of a return value 240 without performing any side effects.

In some examples or embodiments, the compiler-created cache 214 includes a fixed size array of contiguous entries 216, each entry 216 being the size of a function pointer, and each entry 216 corresponding to a different indirect routine call site 206.

In some examples or embodiments, the compiler-generated machine code 124 includes a sequence of instructions 116 which includes a comparison 222 between the target address 210 of the indirect routine call site 206 and the compiler-created cache entry 216 at a hardcoded offset 220 in the compiler-created cache 214, and the sequence of instructions 1116 also includes a jump 232 to call an intervening routine 226 when the target address 210 does not equal the compiler-created cache entry 216, the call to the intervening routine 226 preceding an invocation of target code 212 at the target address 210.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly and linguistically with the embodiment. Software processes may be users 104.

In some embodiments, the system includes multiple computers or other devices 102 connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, a code generator 202 may emit codes 222, 224, 230, 232 on one device/system 102 in a networked cloud, and copies of an application 120 containing those codes may be stored on yet other devices within the cloud.

Processes

Figure 3:
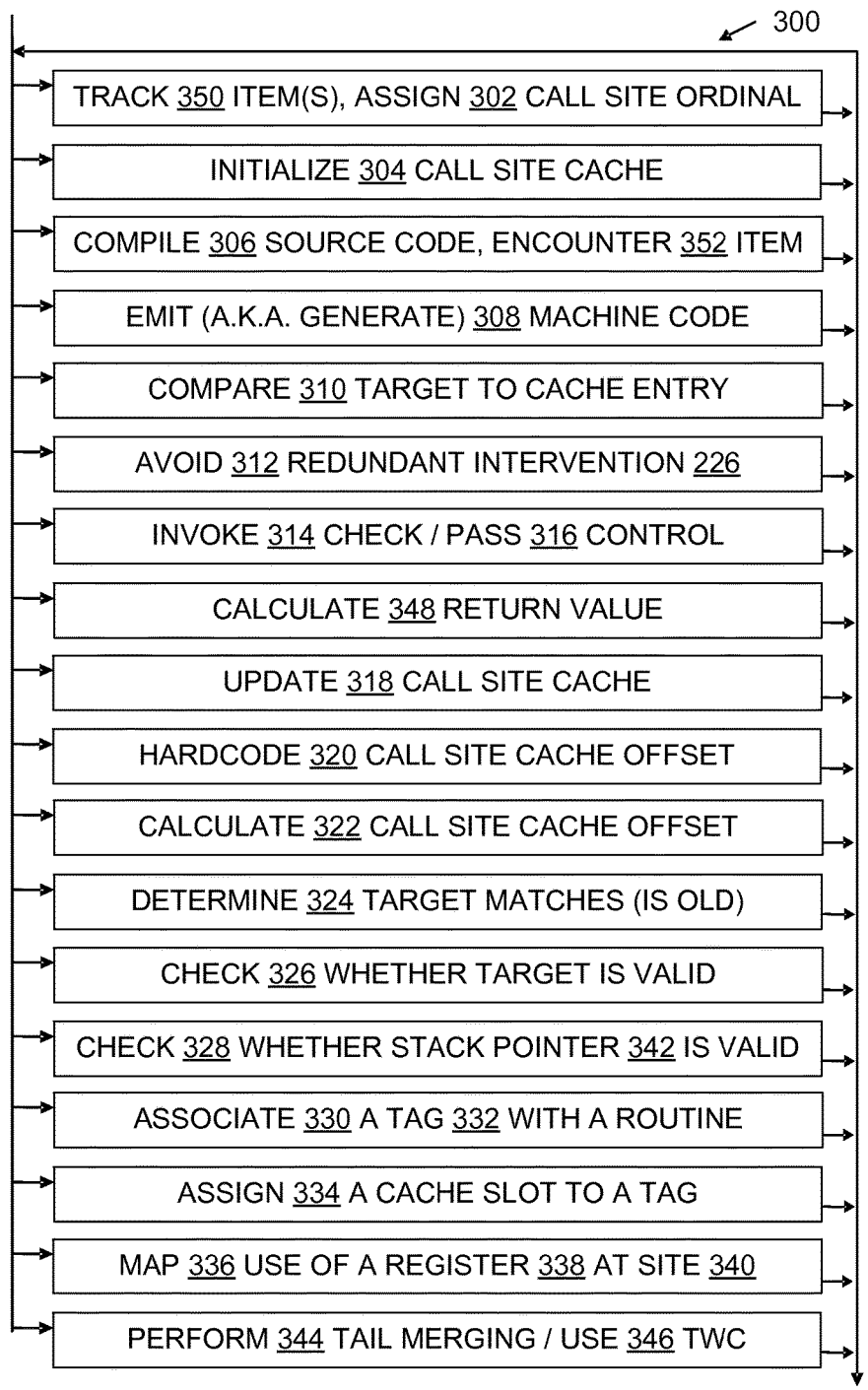
FIG. 3 is a flow chart illustrating steps of some processes and some configured storage media in compiler-managed caching for runtime routine redundancy tracking.

FIG. 3 illustrates some process embodiments in a flowchart 300. Technical processes shown in the Figures or otherwise disclosed may be performed in some embodiments automatically, e.g., by a compiler code generator under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

In some examples, an algorithmic process for optimization by a compiler of indirect call checking proceeds as follows. During compilation the compiler assigns 302 ordinals to call sites and initializes 304 a call site array or other cache 214. When the compiler encounters in code 122 being compiled 306 an indirect call having a target, then the compiler checks 310 (or emits 308 code to check 310) whether the target of the indirect call in code being compiled is the same as a cached target of the indirect call. Although a single reference numeral 308 is used at this point for all code emitting steps, separate reference numerals may also be used in an alternative description, e.g., 308_222 or 308A for emitting code 222, 308_224 or 308B for emitting code 224, 308_230 or 308C for emitting code 230, and 308_232 or 308D for emitting code 232. When the target of the indirect call in the code being compiled is the same as the cached target of the indirect call, then the compiler emits machine code 224 which upon execution will pass control to the target without an intervening check 226 of the target, thus avoiding 312 a redundant check 226. When the target of the indirect call in the code being compiled is not the same as the cached target of the indirect call, then the compiler emits machine code 232 which upon execution will pass control to an intervening check of the target and then conditioned upon a result of the intervening check conditionally pass control 316 to the target, and also updating 318 the cached target to be the target of the indirect call. In some cases, the intervening check 226 includes an intervening security check 228.

In some examples or embodiments, an algorithmic process for optimization by a compiler of indirect call checking includes the following: when the compiler encounters 352 in code being compiled 306 an indirect call having a target, then checking 310 whether the target of the indirect call in code being compiled is the same as a cached target of the indirect call; emitting 308 machine code which upon execution will pass 316 control to the target without an intervening check of the target when the target of the indirect call in the code being compiled is the same as the cached target of the indirect call; and emitting 308 machine code which upon execution will pass 316 control to an intervening check 226 of the target when the target of the indirect call in the code being compiled is not the same as the cached target of the indirect call, and then conditioned upon a result of the intervening check will conditionally pass 316 control to the target, and also emitting 308 machine code which will update 318 the cached target to be the target of the indirect call.

In some examples or embodiments, the intervening check 226 includes an intervening security check 228 to detect malware.

In some examples or embodiments, the process further includes the compiler assigning 302 ordinals to indirect call sites, and indirect call targets are stored at cache locations that are calculated 322 from the assigned ordinals.

In some examples or embodiments, indirect call targets are stored at cache locations that are calculated 322 using a routine counter 242 and an indirect call site counter 242, the routine counter tracking 350 how many routines 128 are encountered 352 by the compiler in a program that is being compiled 306, and the indirect call site counter tracking 350 how many indirect call sites 206 are encountered 352 by the compiler in a given routine 128 that is being compiled 306.

In some examples or embodiments, checking 310 whether the target of the indirect call in code being compiled 306 is the same as a cached target of the indirect call includes using a hardcoded 320 call site cache offset 220.

Some examples or embodiments further include at least one of the following: performing 344 tail merging to reduce code size, enhancing call site cache security using 346 a trustworthy computing mechanism (TWC) 244 which limits access to the call site cache 214 via authentication.

Some examples or embodiments further include emitting 308 machine code which upon execution will check 328 validity of a stack pointer register 342.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as call site ordinals 204, a call site cache 214, hardcoded call site cache offsets 220, and code sequences 222, 224, 230, and/or 232, in the form of data 118 and instructions 116, read from a removable medium 114 and/or another source such as a network connection, to form a configured medium.

In some examples, a computer-readable storage medium 114 is configured with data and with instructions that when executed by at least one processor 110 causes the processor to perform an algorithmic process for generation of machine code for tracking calls to dynamically specified routines in a programming language 130. The process includes emitting 308 machine code which upon execution will test 310 an indirect call address to a dynamically specified routine against an address stored at a hardcoded location in a cache of indirect call targets. When the test 310 determines 324 that the indirect call address matches the address stored at the hardcoded location in the cache of indirect call targets, emitting 308 machine code which upon execution avoids 312 calling 314 a predetermined check routine 226 and instead passes control 316 to the dynamically specified routine 212. When the test 310 determines 326 that the indirect call address does not match the address stored at the hardcoded location in the cache of indirect call targets, emitting 308 machine code 230 which upon execution updates 318 the hardcoded location 216 in the cache of indirect call targets to hold the indirect call address 210 and calls 314 the predetermined check routine 226 to determine whether to pass control to the dynamically specified routine. Some examples repeat some or all of the foregoing steps with each of a plurality of different hardcoded locations 216 in a contiguous cache 214 of indirect call targets.

In some examples or embodiments, a computer-readable storage medium 114 which is not a signal per se is configured with data 118 and with instructions 116 that when executed by at least one processor 110 causes the processor to perform an algorithmic process for generation of machine code for tracking calls 126 to dynamically specified routines in a programming language, the process including the steps of: emitting 308 machine code 222 which upon execution will test 310 an indirect call address 210 to a dynamically specified routine 128 against an address 210 stored at a hardcoded 320 location in a cache 214 of indirect call targets; emitting 308 machine code 224 which upon execution makes a jump which avoids 312 calling a predetermined check routine 226 when the test determines that the indirect call address matches the address stored at the hardcoded location in the cache of indirect call targets and instead passes 316 control to the dynamically specified routine 212; and emitting 308 machine code which upon execution when the test 310 determines that the indirect call address does not match the address stored at the hardcoded location in the cache of indirect call targets updates 318 the hardcoded location in the cache 214 of indirect call targets to hold the indirect call address and emitting 308 machine code 232 which calls the predetermined check routine 226 to determine whether to pass control to the dynamically specified routine 212.

In some examples or embodiments, the process includes repeating the emitting steps 308 with each of a plurality of different hardcoded 320 locations in a contiguous cache 214 of indirect call targets 210.

In some examples or embodiments, the process includes emitting 308 a machine code compare instruction 234, 222 with a hardcoded location in the cache to test 310 a target against a cache entry, emitting 308 a machine code move instruction 236, 230 to update 318 a cache entry, emitting 308 a first machine code jump instruction 238, 224 to avoid making a redundant call to a security check, and emitting a second machine code jump instruction 238, 232 to make a non-redundant call to the security check 228 or other routine 226.

In some examples or embodiments, the process further includes emitting 308 machine code which upon execution will check 328 validity of a stack pointer register 342.

In some examples or embodiments, the cache 214 includes a fixed size array of entries 216, each entry being the size of a function pointer 210.

In some examples or embodiments, the process further includes using ordinals assigned 302 to indirect routine call sites to calculate 322 hardcoded 320 locations in the cache 214.

The configured medium 112 is capable of causing a computer system to perform technical process steps for property access code optimization as disclosed herein. FIGS. 1 and 2 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment. For scope of disclosure purposes, the discussion under this "Configured Media" heading is deemed to be duplicated under the "Processes" heading, and the discussion under the "Processes" heading is deemed to be duplicated under this "Configured Media" heading. Moreover, processes are also discussed elsewhere in this disclosure, under neither heading. Headings are for convenience only; they do not limit the scope or content of the teachings herein.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs, specific memory addresses, specific property and object names, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some discussion herein is derived from some Windows 9 "Threshold" documentation. Windows 9 is software implemented by Microsoft Corporation, and along "Threshold" refers generally in marketing or other materials (from third parties as well as Microsoft) to a version of the Microsoft® Windows® software (marks of Microsoft Corporation). Aspects of this software and/or documentation are consistent with or otherwise illustrate aspects of some of the embodiments described herein. However, it will be understood that such documentation and/or implementation choices do not necessarily constrain the scope of any examples or embodiments described herein, and likewise that "Windows 9 Threshold" code and/or its documentation may well contain features that lie outside the scope of such embodiments and examples. It will also be understood that some discussion herein is provided in part as an aid to readers who are not necessarily of ordinary skill in the art, and thus may contain and/or omit details whose recitation below is not strictly required to support the present disclosure.

By way of context, a virtual call in C++ is implemented as an indirect call. To execute an indirect call, code loads a function address from memory and then calls that loaded address. A compiler accordingly emits code to perform the function address load and to make the call to the loaded address. Indirect calls differ from direct calls; to implement a direct call, a compiler generates a call to a symbol that is resolved to a known constant address by a linker. A link error occurs for a direct call if the symbol representing the called routine cannot be resolved to an actual address by the linker or a similar pre-execution tool such as a binder. Although indirect calls provide useful flexibility, indirect calls are also where many exploits occur. For instance, malevolent hackers may slam some malware into memory and then alter the indirect call's target so that the indirect call will pass control to the malware code.

Some IDEs or other software development tools implement technology that checks every indirect call in a program, e.g., by passing control to a security check 228 that determines whether the target of the indirect call is valid. If the target is not valid, control is not passed to the code at the target address. If the target is valid, control is passed to the code at the target address. These checks improve security, but they can substantially slow down a program 120 which contains numerous indirect calls, e.g., C++ virtual calls. Virtual calls in C++ support the computer science teaching of polymorphism. Indirect calls are sometimes referred to as "i-calls" or "icalls".

In some examples taught herein, by caching targets and checking the cache as described, an extended compiler generates a new kind of security check for indirect calls. An indirect call site is "redundant" if it calls a security check or another function that will consume processor cycles, memory, and/or other resources to produce a result that has been previously produced and is available and can be determined by the compiler to still be valid. If the indirect call site is redundant (as it is in some browsers, for example,) then caching techniques described herein will speed up execution by avoiding making redundant security check calls. This may be accomplished by implementing a sequence of code 222 that checks whether an indirect call site is the same as it was the last time the indirect call site was checked. If it is the same, then the heavy weight security check 228 is not performed; it is redundant. If the indirect call site is not the same as it was last time, then either this is the first call from that site and the security check should be made (the cache entry is null or another value that is identifiable in one compare as invalid), or else the security check was made but it was made on a different target, so it should be made on the current target.

The following case study may be helpful. An internal development task was defined to rewrite guard code generation for optimization of redundant i-calls. The task arose after analysis of a Microsoft® Internet Explorer® web browser led to the observation that script functionality had been virtualized for Jscript®, Visual Basic® for Applications, server side execution scripts, and other script-based components (marks of Microsoft Corporation). In this browser implementation, after mshtml.dll binds to an implementation of a script engine, all the virtual call sites invoke the same indirect function pointer, which /Guard checks to detect malware exploits. This observation was calculated and verified by having every i-call check that was originally emitted cache a single function target. If that function target was called again, from that i-call check at that call site, the call counted as a hit to a cache, otherwise code updated the cache to the new target. This calculation resulted in the following statistics:
Mshtml—Total checks: 775,353,998; Total hit cache: 739,033,269; Efficiency: ~95.3%
Jscript9—Total checks: 424,137,653; Total hit cache: 399,552,911; Efficiency: ~94.2%

A version of compiler code generation was implemented internally that manages a private runtime cache 214 and uses that cache to avoid redundantly checking indirect calls. One variation does tail merging at the DLL level, to keep code size down. One variation does both a calling convention check (check validity of the stack pointer register ESP, e.g., is it in the correct address range for this process) and the target check (target is in the cache entry vs. target is a new address 210) on a cold path. Some designs satisfy trustworthy computing criteria to improve cache 214 security. Some designs include profile-guided optimization to optimize the code generation described herein As another example, consider the following C++ program, designated here as code example 1:

```
typedef void (*fptr_to_check) (int a, int b);
fptr_to_check A[100] = {0, 0, function_1, 0, function_2} ;
main ( ) {
    // My indirect function call (caller restores)
    (A[2]) (1,2);
}
```

One example will generate 308 the following x86 machine code so that every indirect or virtual call will be checked 326 by code 228 for validity as a call target, and checked 328 to determine whether ESP has been hacked by a calling convention mismatch. The code works with new /Guard library code (also shown below) when it transitions to _guard_jims_slow in the example. This code is emitted 308 for x86 (not x64) processors 110, with two checks for security. One check looks 328 for a calling convention exploit by checking ESP before and after a call. The other check tests call target validity using memory manager changes for a table. This code is designated here as code example 2:

```
push 2
push 1
cmp      eax, DWORD PTR ___guard_cache+12    // check
je   SHORT $LN6@main
mov      DWORD PTR ___guard_cache+12, eax    // store
lea  esi, DWORD PTR [esp+8]
mov      ebx, $LN3@main
jmp      ___guard_slow
$LN6@main:
    call eax  // indirect call site for (*fptr)(1,2)
$LN3@main:
    // code for body of main
    ret
```

In code example 2, the cmp instruction is an example of code 222 to test a target against a cache entry. The offset 12 used in that cmp instruction is a hardcoded offset 220 based on 4-byte addresses to access the third entry 216 of the cache 214. The mov instruction with comment "//store" is an example of code 230 to update a cache 214 entry. The je instruction is an example of code 224 to avoid making a redundant call to a security check 228, and the jmp instruction is an example of code 232 to make a non-redundant call to the security check 228. These instructions 116 in code example 2 are merely examples. Codes 222, 224, 230, 232 may include additional instructions, and may also be implemented in other assembly languages or other low-level languages, and/or be implemented for processors such as ARM processors and other non-x86 processors 110.

In this example, new library code appears in a common runtime and will statically link into every DLL for cache and type library locality. This is designated herein as code example 3:

```
int __guard_jims_cache[8*1024];
// -----------------------------------------------------------------
// Appearing ONCE at the bottom of the DLL for all indirect calls in a
DLL:
void __guard_slow( ) {
    __asm {
        call    __guard_check_icall4        // function pointer
in eax, goes to windows data
        call    eax                          // do the icall
        cmp     esi, esp                     // check stack pointer
after call (calling convention hack)
        jne     SHORT $NOT_OK                // don't die
        jmp     ebx                          // brings us back to
$Return_From_Slow and pops one DWORD
$NOT_OK:
        mov     ecx, 4                       // die
        int     41                           // die
    }
}
__declspec(naked)
void __guard_check_icall4( )
{
    __asm {
        <... SNIP ...>
    }
}
```

Under one approach, the generation 308 was not on by default, but was instead provided under a switch for use by internal development teams. A prototype (without tail merging stack checks but caching) led to a 5% overhead on one web browser version under limited testing, which was about half the overhead of checking every call site despite redundancy.

Turning now to the particular step of assigning 302 ordinals to calls sites, and related tools and techniques, one approach to assigning ordinals to specific call sites in a function is illustrated using the following code, which is designated herein as code example 4:

```
#define CACHE_LINES 2048
// determine compiler managed cache slot for an indirect call.
OFFSET GetOffsetForCache(PFUNC func)
{
    int intFunctionOrdinal = SS_EENUMBER(FU_ENTRY(func));
    int intlCallsInFunction = FU_CFG_CACHESLOT(func)++;
    OFFSET offset = (((intFunctionOrdinal + intlCallsInFunction)) %
CACHE_LINES) * MACH_REG_PTR;
    return offset;
}
```

With particular attention to the portion of code shown in bold in code example 4, this approach uses two counters that the compiler tracks while compiling an application. One counts each function that is compiled. Another counts each indirect call site in the current function that is being compiled. The extended compiler then adds the counters and gets a number that is N mod Number_Cache_Slots. In code example 4 the cache 214 has 2048 cache slots (i.e., cache entries 216). Therefore a wraparound is possible. If the sum of the current function number plus the number of the current indirect call site is 2049, then this will map to cache slot 1. The multiplier ("*MACH_REG_PTR) in the bold part of code is calculating a byte offset from the beginning of the compiler managed cache. In other words, that bolded code is calculating a logical slot (i.e., an index 218) in the cache and then converting it to an address in memory that can be used in load/store machine instructions.

As further illustration, code example 5 below shows some functions that contain indirect function calls, along with annotations that indicate the two numbers intFunctionOrdinal+intlCallsInFunction that are incremented while compiling 306 code:

```
// ------------------------------------------------------------------------
// AbstractDOMParser: Initialize/CleanUp methods
// ------------------------------------------------------------------------
                  <...code...>
void AbstractDOMParser::initialize( ) // intFunctionOrdinal == 337
{
    // Create grammar resolver and string pool to pass to the scanner
    fGrammarResolver = new (fMemoryManager)
GrammarResolver(fGrammarPool, fMemoryManager);
    fURIStringPool = fGrammarResolver->getStringPool( );
    // Create a scanner and tell it what validator to use. Then set us
    // as the document event handler so we can fill the DOM document.
    fScanner = XMLScannerResolver::getDefaultScanner(fValidator,
fGrammarResolver, fMemoryManager);
    fScanner->setDocHandler(this); //intlCallsInFunction==1
    fScanner->setDocTypeHandler(this); //intlCallsInFunction==2
    fScanner->setURIStringPool(fURIStringPool);
    //intlCallsInFunction==3
    fNodeStack = new (fMemoryManager)
ValueStackOf<DOMNode*>(64, fMemoryManager);
    this->reset( );//intlCallsInFunction==4
}
void AbstractDOMParser::cleanUp( )// intFunctionOrdinal == 338
{
    if (fDocumentVector)
        delete fDocumentVector;
```

-continued

```
    if (!fDocumentAdoptedByUser && fDocument)
        fDocument->release( );//intlCallsInFunction==1
    delete fNodeStack;
    delete fScanner;
    delete fGrammarResolver;
    // grammar pool *always* owns this
    //delete fURIStringPool;
    fMemoryManager->deallocate(fImplementationFeatures);
//intlCallsInFunction==2
    if (fValidator)
        delete fValidator;
}
        <...large block of deleted code...>
// ------------------------------------------------------------------------
// ------------------------------------------------------------------------
```

As further illustration, code example 5 below shows some functions that contain indirect function calls, along with annotations that indicate the two numbers intFunctionOrdinal+intlCallsInFunction that are incremented while compiling 306 code: In this code example 5 two functions happened to be assigned the ordinal values 337 and 338. If one more function were shown in the example code, it would have been assigned 339 and so on.

In the function numbered 337 there are 4 indirect function calls, shown below as code example 6:

```
    fScanner->setDocHandler(this);
    fScanner->setDocTypeHandler(this);
    fScanner->setURIStringPool(fURIStringPool);
    this->reset( );
```

Applying an algorithm to determine the byte offset in the actual cache would include calculations like those shown below as code example 7:

```
fScanner->setDocHandler(this);       //(((337 + 1) % 2048) * 4 bytes/pointer)
fScanner->setDocTypeHandler(this); //(((337 + 2) % 2048) * 4 bytes/pointer) ==
2696 used in code example 8
fScanner->setURIStringPool(fURIStringPool); //(((337 + 3) % 2048) * 4
bytes/pointer)
this->reset( );                      //(((337 + 4) % 2048) * 4 bytes/pointer)
```

Code generated 308 at the second indirect call site in the function identified by ordinal 337 could look like the following code example 8:

```
            <... SNIP ...>
    push    2
    push    1
    cmp         eax, DWORD PTR ___guard_cache+2696    // check the cache slot
    je  SHORT $LN6@main
    mov         DWORD PTR ___guard_cache+2696,eax    // store the function pointer
into the cache slot
    lea  esi, DWORD PTR [esp+8]
    mov         ebx, $LN3@main
    jmp  ___guard_slow
$LN6@main:
    call   eax   // indirect call site for (*fptr)(1,2)
$LN3@main:
            <... SNIP ...>
```

One may use the phrase "compiler-managed" to characterize the cache 214 because the enhanced compiler internally owns and operates functionality for consistently mapping the compile time instance of an indirect call site to a runtime location in the computer's memory 112. The examples show that at runtime, the code produced by the compiler will be able to check whether the function pointer at a particular call site has changed since the last time it was checked. If the compiler-managed slot 216 contains the same function pointer that was previously stored there, then there is no need to do the heavy weight check 228 that is on the_guard_slow execution path.

Given the teachings herein, one of skill will acknowledge that other tasks could be done in addition to, or in place of, the heavy security check 228. In particular, this compiler-managed caching approach could be used in other scenarios, outside the security domain, for a runtime elimination of redundancy. Any runtime function that is computationally expensive could be avoided if it is detected to be redundant by using a cache that is managed by the compiler. This can be accomplished by associating 330 an internal tag 332 with the runtime function 128 and having the enhanced compiler assign 334 a cache slot to that tag. This is illustrated by code example 9:

```
compile_time_slot_number = F(compile time values) //code example 4
used
function number and indirect call site number within that function
cache_offset = compile_time_slot_number * sizeof(pointer)
```

So for example one could map 336 the use of a processor register 338 at a particular site 340 in a particular function 128. If that register would contain the return value from some long running function that returned a value in EAX (and did not side-effect global state), one could cache the value returned by that function. This could be done for any function. At runtime this would reduce or eliminate partially redundant recalculation of values in a long running function. In particular, instead of mapping indirect function calls as in code example 4 and related code examples, one could map the return values of functions at runtime. On the x86 architecture, this return value is passed in register EAX. So after register allocation in a function, one could associate a simple ordinal with each appearance of EAX that's been defined by a return value from some function. Then an enhanced compiler's code generator 202 could generate code accordingly at each call site and avoid redundant computation to calculate 348 the return value. These call sites could be data base queries or search requests or anything that is long running if the computation is at least sometimes redundant. Regardless, the compiler has context that runtime hardware lacks, because the compiler can track activity and structures in much larger portions of code.

One could also enable or disable any of the illustrated redundancy removal optimizations on a per-call-site basis via a compilation pragma, source annotation, or other compiler directive or instruction. One could do profiling to determine whether there is redundancy at runtime, and how much redundancy. One could add metrics to determine the best effective cache size. With a simple wrap around there will sometimes be conflicts in the cache slots.

Additional Combinations and Variations

Any of the systems alone or in combination may be equipped with a means for tracking runtime routine redundancy. Suitable means may include, for example, any one or more of codes 222, 224, 230 and/or a code generator 202 designed to emit such codes, stored in a memory and executable by a processor which operates such that routine redundancy reduction or a functional equivalent may also be part of the stated means. An implementation of any algorithm discussed herein, or any code example herein, or any mechanism for emitting any code example herein, or a functional equivalent in another code sequence or another machine code or for another processor 110 family, may be part of the stated means.

Any of these combinations of code and their functional equivalents may also be combined with any of the systems and their variations described above, by configuring memory 112 of the system in question and/or configuring a removable medium 114 of the system in question. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

In some examples or embodiments, a means for assigning ordinals to indirect call sites includes an incrementing routine counter 242, an incrementing indirect call site counter 242, and compiler code which increments these counters and calculates ordinals 204 based on current values of the counters during compilation. In some examples or embodiments, a means for reducing redundancy includes emitted codes 222, 224, 230, and 232. In some examples or embodiments, a means for testing a target address includes a compare instruction 234 with an operand that includes a hardcoded offset 220 into a cache 214.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 12-15 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system comprising:
   at least one processor;
   a memory in operable communication with the processor; and
   compiler-generated machine code which upon execution by the processor performs a comparison at runtime comparing a target address of an indirect routine call site to an entry in a compiler-created cache that contains entries for target addresses of multiple indirect routine call sites, said comparison performed using as an index into the compiler-created cache an ordinal which was assigned to the indirect routine call site at compile time, said compiler-generated machine code configured to update the compiler-created cache entry at runtime with the indirect routine call site target address when the target address does not match the cache entry, wherein the compiler-generated machine code comprises a sequence of instructions which includes a comparison between the target address of the indirect routine call site and the compiler-created cache entry in the compiler-created cache, and the sequence of instructions also includes a jump to avoid calling an intervening routine when the target address equals the compiler-created cache entry, thereby avoiding a redundant call to the intervening routine, the system configured to utilize compiler-generated optimizations to avoid redundant calls.

2. The system of claim 1, wherein the system comprises compiler-generated machine code which upon execution performs tail merging to reduce code size.

3. The system of claim 1, wherein the system comprises a code generator which assigns respective ordinals to different indirect routine call sites and which hardcodes accesses to the compiler-created cache using offset constants that are calculated at compile-time based on the respective ordinals.

4. The system of claim 1, wherein the intervening routine is configured to perform a security check to determine whether a target at the target address includes malware.

5. The system of claim 1, wherein the intervening routine is configured to perform a calculation of a return value without performing any side effects.

6. The system of claim 1, wherein the compiler-created cache is present in the system with each cache entry being the size of a function pointer, and each cache entry corresponding to a different indirect routine call site.

7. The system of claim 1, wherein the compiler-generated machine code also includes a jump to call the intervening routine when the target address does not equal the compiler-created cache entry, the call to the intervening routine preceding an invocation of target code at the target address.

8. A system comprising:
   at least one processor;
   a memory in operable communication with the processor; and
   an assignment of respective ordinals to different indirect routine call sites in code which is being compiled in the system, and compiler-generated machine code which upon execution by the processor performs a comparison at runtime comparing a target address of one of the indirect routine call sites to an entry in a compiler-created cache that contains entries for target addresses of multiple indirect routine call sites, and the compiler-generated machine code updates the compiler-created cache entry with the indirect routine call site target address when the target address does not match the cache entry, said comparison performed using as an index into the compiler-created cache the ordinal which was assigned to the indirect routine call site at compile time, wherein the compiler-generated machine code comprises a sequence of instructions which includes a comparison between the target address of the indirect routine call site and the compiler-created cache entry at a hardcoded offset in the compiler-created cache, the compiler-created cache is includes only a single entry per indirect routine call site, and the sequence of instructions also includes a jump to avoid calling an intervening routine when the target address equals the compiler-created cache entry, thereby avoiding a redundant call to the intervening routine, the system configured to utilize compiler-generated optimizations to avoid redundant calls.

9. The system of claim 8, wherein the system comprises compiler-generated machine code which upon execution enhances call site cache security using a trustworthy computing mechanism which limits access to the call site cache via authentication.

10. The system of claim 8, wherein the system comprises a code generator which assigns respective ordinals to different indirect routine call sites and which hardcodes accesses to the compiler-created cache using offset constants that are calculated at compile-time based on the respective ordinals.

11. The system of claim 8, wherein the intervening routine is configured to produce a result that has been previously produced and is available and still valid.

12. The system of claim 8, wherein the intervening routine is configured to perform a calculation of a return value without performing any side effects.

13. The system of claim 8, wherein the compiler-created cache is present in the system and includes a fixed size array of contiguous entries, each entry corresponding to a different indirect routine call site.

14. The system of claim 8, wherein the compiler-generated machine code also includes a jump to call the intervening routine when the target address does not equal the compiler-created cache entry, the call to the intervening routine preceding an invocation of target code at the target address.

15. A system comprising:
at least one processor;
a memory in operable communication with the processor; and
compiler-generated machine code which upon execution by the processor performs a comparison at runtime comparing a target address of an indirect routine call site to an entry in a compiler-created cache that contains entries for target addresses of multiple indirect routine call sites, said comparison performed using as an index into the compiler-created cache an ordinal which was assigned to the indirect routine call site at compile time, said compiler-generated machine code configured to update one or more of the compiler-created cache entries with the respective indirect routine call site target addresses when the target addresses do not match the respective cache entries, wherein the compiler-generated machine code comprises a sequence of instructions which includes a comparison between the target address of the indirect routine call site and the compiler-created cache entry in the compiler-created cache, and the sequence of instructions also includes a jump to avoid calling an intervening routine when the target address equals the compiler-created cache entry, thereby avoiding a redundant call to the intervening routine, the system configured to utilize compiler-generated optimizations to avoid redundant calls, and wherein the system comprises compiler-generated machine code which upon execution will check validity of a stack pointer register.

16. The system of claim 15, wherein the intervening routine comprises code configured to perform a security check, and the system comprises a first compiler-generated machine code jump instruction to avoid making a redundant call to perform the security check, and a second compiler-generated machine code jump instruction to make a non-redundant call to perform the security check.

17. The system of claim 15, wherein the system associates an internal tag with a runtime function and assigns a slot of the compiler-created cache to the internal tag to hold a value returned by the runtime function.

18. The system of claim 15, wherein the compiler-created cache includes a fixed size array of entries, each entry being the size of a function pointer.

19. The system of claim 15, wherein the system comprises compiler-generated machine code which upon execution uses a hardcoded call site cache offset.

20. The system of claim 15, wherein the system comprises compiler-generated machine code which upon execution performs at least one of the following: tail merging to reduce code size, or enhancing call site cache security using a trustworthy computing mechanism which limits access to the call site cache via authentication.

* * * * *